(12) United States Patent
Gurdjian et al.

(10) Patent No.: US 6,729,677 B2
(45) Date of Patent: May 4, 2004

(54) FULL BODY SLIDE AND INTEGRATED CHASSIS

(76) Inventors: Edwin S. Gurdjian, 13920 Arbuckle Rd., Union City, PA (US) 16438; Carol F. Maxwell, 13920 Arbuckle Rd., Union City, PA (US) 16438; Carl A. Fiorletta, 4600 Versailles La., Plano, TX (US) 75093

( * ) Notice: Subject to any disclaimer, the term of this patent is extended or adjusted under 35 U.S.C. 154(b) by 0 days.

(21) Appl. No.: 10/371,366

(22) Filed: Feb. 19, 2003

(65) Prior Publication Data

US 2003/0155791 A1 Aug. 21, 2003

Related U.S. Application Data

(60) Provisional application No. 60/359,006, filed on Feb. 20, 2002.

(51) Int. Cl.[7] ............................................. B60P 3/355
(52) U.S. Cl. .................... 296/156; 296/156; 296/172; 296/176; 296/26.13
(58) Field of Search ................... 296/156, 26.12, 296/26.13, 165, 172, 171, 175, 176

(56) References Cited

U.S. PATENT DOCUMENTS

| | | | | |
|---|---|---|---|---|
| 4,955,661 A | * | 9/1990 | Mattice | |
| 5,291,701 A | * | 3/1994 | Delacollette et al. | |
| 5,785,373 A | * | 7/1998 | Futrell et al. | 296/26.13 |
| 6,048,016 A | * | 4/2000 | Futrell et al. | 296/26.13 |
| 6,345,854 B1 | * | 2/2002 | McManus | 296/26.13 |
| 6,471,275 B1 | * | 10/2002 | Kunz et al. | 296/26.01 |
| 2002/0153745 A1 | * | 10/2002 | Messano | 296/156 |

* cited by examiner

*Primary Examiner*—D. Glenn Dayoan
*Assistant Examiner*—Hilary Gutman

(57) ABSTRACT

A full body slide out room assembly is comprised of a vehicle with stationary end modules, a stationary roof and a plurality of moveable room assemblies that consist of a telescoping roof, floor, anterior walls, and end walls. The sliding movement of each room is controlled by one or more linear drive mechanisms that are pneumatic, hydraulic, mechanical, electro-mechanical, or combination of two or more of these methods. Each moveable room is supported by a center or offset longitudinal truss or trusses below the floor level, and a plurality of guide rails and support rails located between the vehicle chassis and the moveable room. Polymer plates are installed between the support and guide rails.

5 Claims, 15 Drawing Sheets

FULL BODY SLIDE AND INTEGRATED CHASSIS

CROSS-REFERENCE TO RELATED APPLICATIONS

This application claims priority from U.S. Provisional Patent Application No. 60/359,006 filed Feb. 20, 2002 titled Integrated Bilateral Full Body or Multiple Slide Chassis for Recreational Vehicles.

Inventors:

| NAME | CITIZENSHIP | RESIDENCE |
| --- | --- | --- |
| Edwin S. Gurdjian | U.S. | 13920 Arbuckle Rd Union City, PA 16438 |
| Carol F. Maxwell | U.S. | 13920 Arbuckle Rd Union City, PA 16438 |
| Carl A. Fiorletta | U.S. | 4600 Versailles Lane Plano, TX 75093 |

BACKGROUND OF THE INVENTION

Recreational vehicles have become a very popular way of traveling, especially for extended periods of time. These vehicles are equipped with a wide variety of amenities that are normally found in a residence. These include fully appointed kitchens, complete bathrooms, laundry facilities, and entertainment centers. For many years, trailers have incorporated expandable rooms, sometimes called slide outs, to increase the interior space while parked and yet maintain legal size requirements while in motion. In the past decade, expandable rooms have become very common in motorhome applications. Owners continue to want more space and more luxurious amenities. In recent years, consumer demands have resulted in manufacturers adding multiple slide-outs to their production models, sometimes as many as four or five in a forty or forty-five foot model. When the expandable rooms are retracted, cupboards, appliances, fixtures, and other components can be inaccessible. This is of more concern in motorhome applications than trailers because people occupy a motorhome, but not a trailer, while in motion. When the expandable room is retracted, the appearance is less pleasing because of the intrusion of the box-like structure through the side wall of the vehicle. Even though current production models are advertised as having six feet or more height in the slide-out room, the height of the primary vehicle is often more than 12" higher than the slide-out module. This difference exists because the room telescopes into the side wall. In addition, conventional recreational vehicles partly rely on the side walls for structural support so multiple small slide-out rooms significantly diminish the strength and integrity of the vehicle.

The present invention, which uses one or two large slide out assemblies rather than multiple small rooms, provides increased living area when expanded, less intrusion on interior space when retracted, and the same interior ceiling height as the rest of the vehicle because the ceiling of the slide-out module telescopes into the roof of the primary vehicle rather than the side wall.

BRIEF SUMMARY OF THE INVENTION

The present invention is a full body or multiple slide out assembly for all types of recreational vehicles. There is a front and rear stationary module and the entire length between the modules can be deployed outwardly from one or both sides, which can nearly double the interior living space. When retracted for travel, the vehicle body meets legal size restrictions. Because the roof of the full body slide moves between the stationary center section interior ceiling and the exterior roof, the appearance of the ceiling remains unchanged and is aesthetically pleasing whether the full body slide is deployed or retracted, and the interior height of the slide-out module is the same as the stationary module.

There is a center or offset longitudinal truss or trusses below the floor level and a longitudinal central spar with lateral ribs at the roof level. The full body slides can be deployed or retracted using a variety of techniques, including manual, hydraulic, electric, mechanical, or a combination of two or more of these methods. The slides can be locked in a retracted or deployed position. In a motorhome application, the front stationary module contains the driver's cab area, including a co-pilot's seat. This area is similar to that in a conventional motorhome. The rear can be any optional room designation such as bathroom, bedroom, or office. In a trailer application, both the front and rear modules can be any optional room designation.

When the full body slides are retracted the floors of each full body slide meet in the middle to create an even, level floor that is contiguous from front to rear and side to side. When the full body slides are extended, a sub-floor automatically elevates to yield a level floor. The sub-floor may be raised and lowered using different means including air pressure, hydraulic pressure or electro-mechanical drive mechanisms.

DETAILED DESCRIPTION OF THE INVENTION

Figure 1:
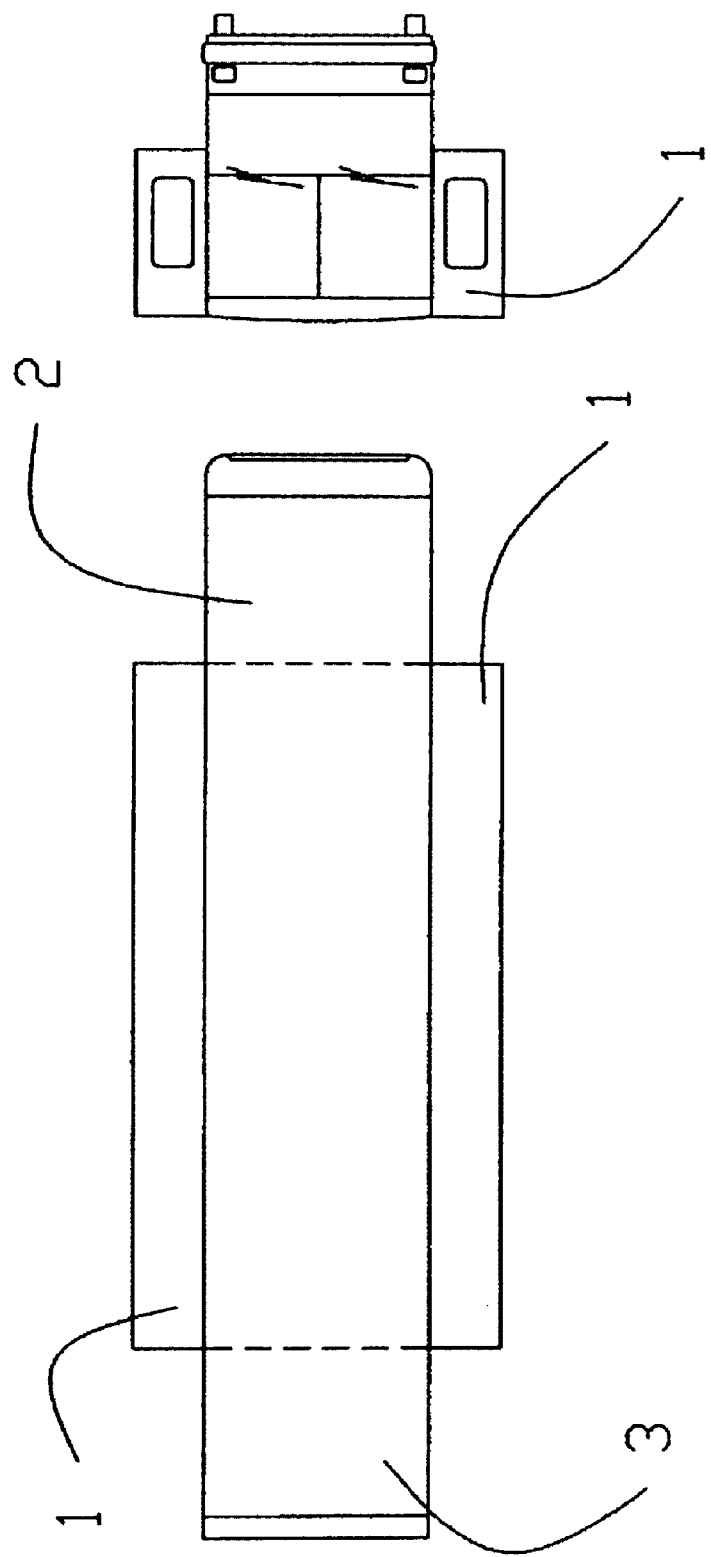
FIG. 1: are plan and front views of a 45' coach with Full Body Slide.

The preferred embodiment of the present invention consists of one or more slide-out modules 1 where each is located between fixed front 2 and rear 3 modules and are not constrained in length, height, or depth other than the overall dimensions of the target vehicle. (FIG. 1)

Figure 2:
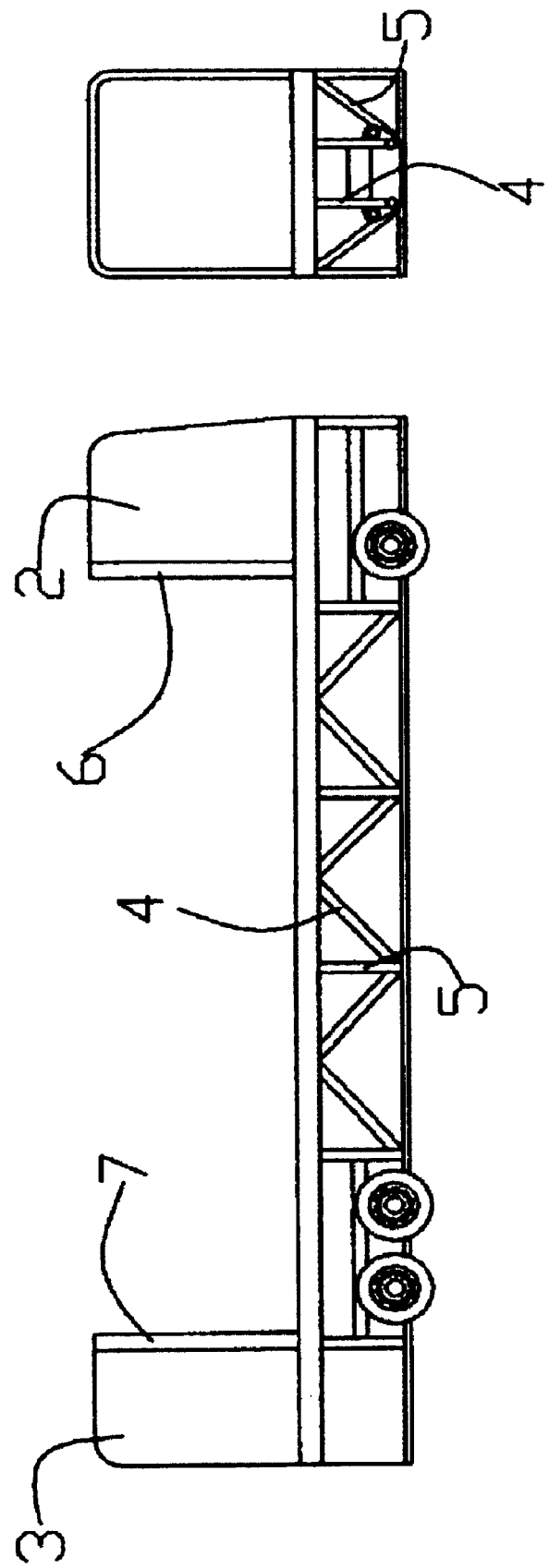
FIG. 2: is a vehicle chassis with front and rear rollbars and stationary modules.

An integrated frill body slide and chassis is comprised of front 2 and rear 3 stationary modules, center or offset longitudinal trusses 4 below the floor level, side to side trusses 5, at least two roll bars, one front 6 and one rear 7 (FIG. 2) a plurality of lateral support rails 8 mounted under the vehicle floor 9 and mechanically attached to the chassis truss assembly 4 of the vehicle (FIG. 3), a central spar 10, an interior ceiling 11, lateral roof ribs 12 which extend from the central spar 10, an external roof covering 13 (FIG. 4) and one or two full length slide-out modules 1.

Front 6 and rear 7 rollbars are structural members consisting of a support column in the left outer wall 14, a horizontal support beam 15 spanning the width of the vehicle and a support column in the right outer wall 16. The front rollbar 6 is located at the rear edge of the front stationary module 2 and the rear rollbar 7 is located at the front edge of the rear stationary module 3. (FIG. 5)

Figure 5:
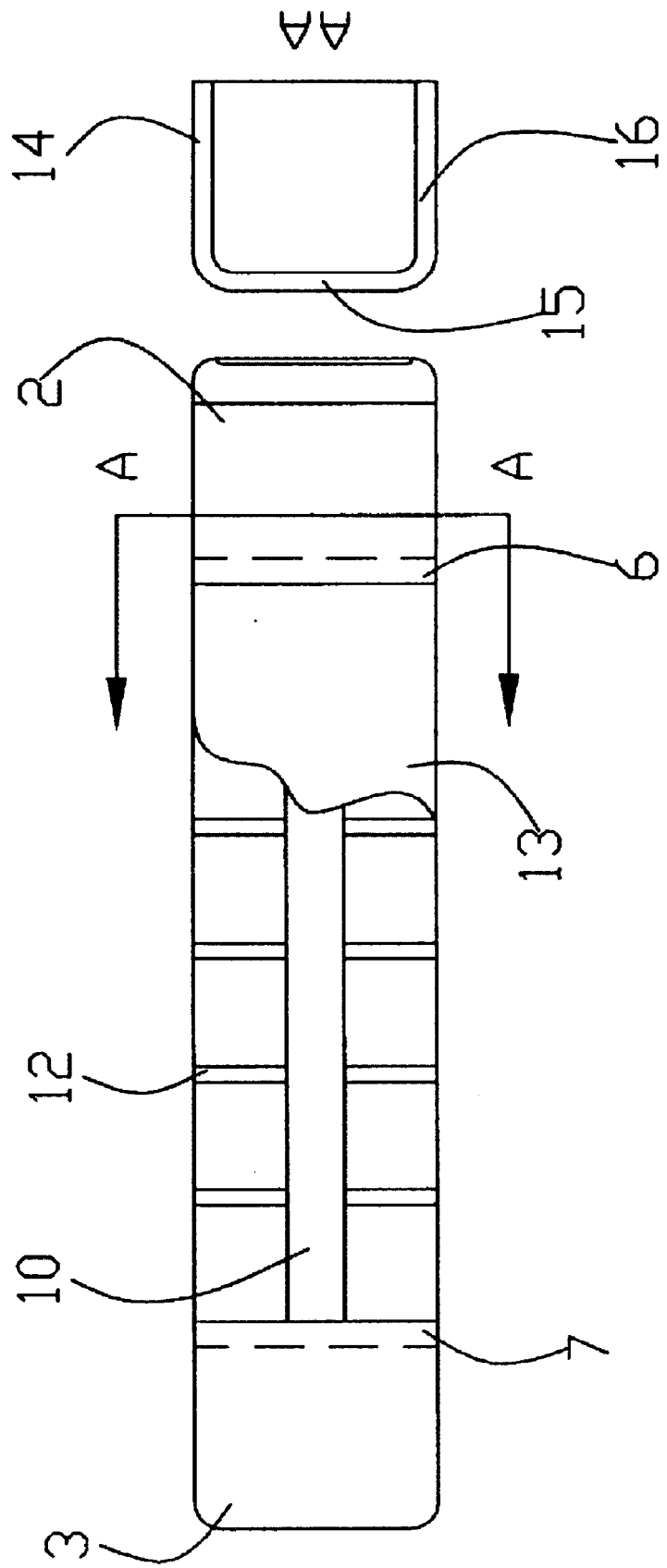
FIG. 5: is a plan view of vehicle showing central space and lateral roof ribs.

As shown in FIG. 5, the central spar 10 located in the roof of the vehicle is a sheetmetal box section that spaces the region from the front rollbar 6 to the rear rollbar 7 and is secured to the rollbars with bolts, rivets, or welds. The dimensions of the spar are typically 24" wide with a length determined by the distance between the front 6 and rear 7 rollbars, which will be dependent on the overall length of the vehicle. Multiple-lateral ribs 12 are mechanically attached perpendicularly to the longitudinal length of the central spar 10 and extend laterally to the outer extremities where the roof ends at the side of the vehicle. The lateral roof ribs 12 support the exterior roof covering 13 of the vehicle.

Figure 6:
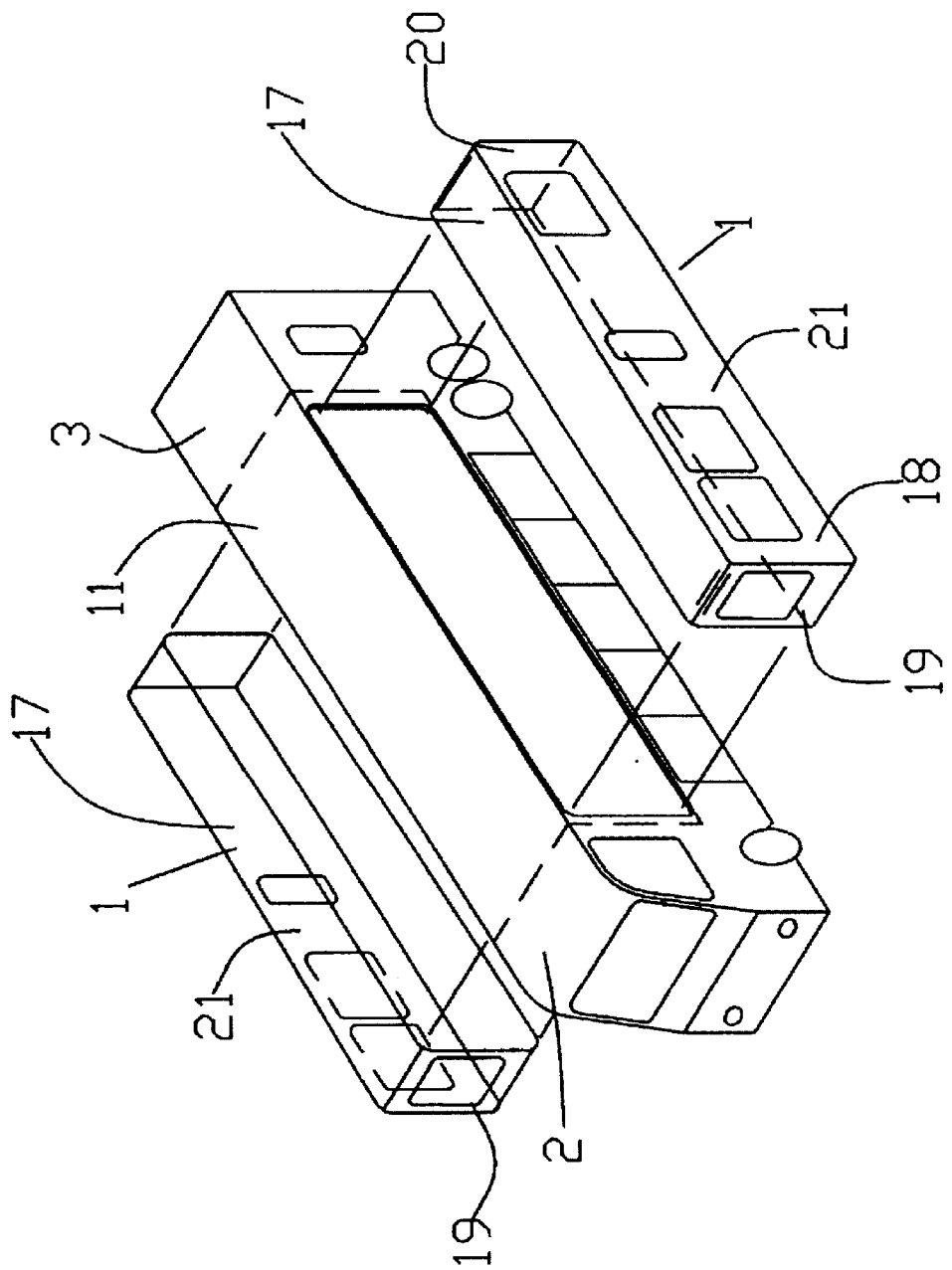
FIG. 6: is a slide-out module.
Figure 7:
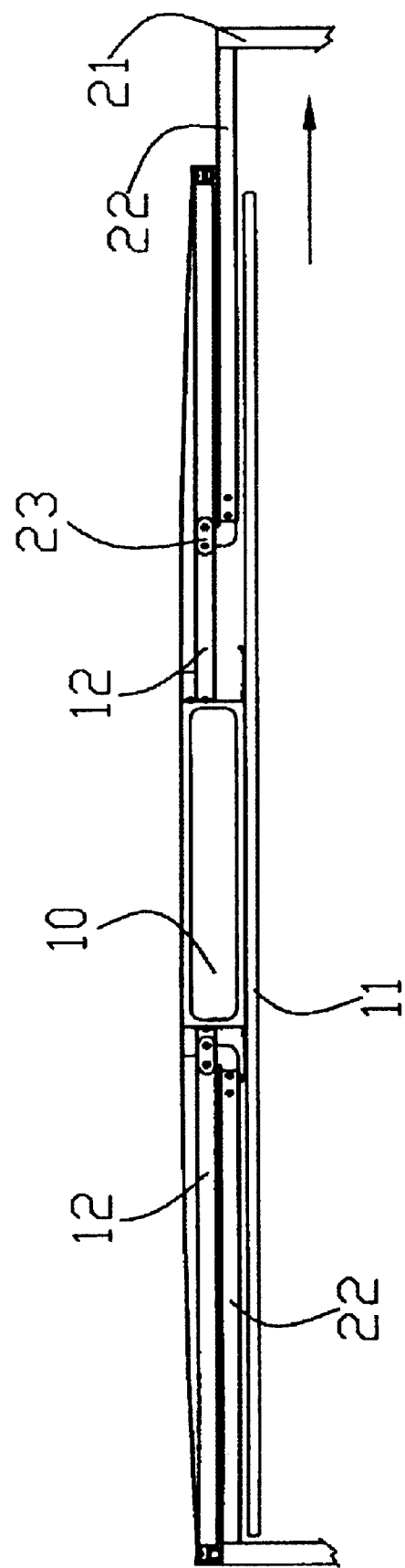
FIG. 7: is cross section, roof with slides and stationary ceiling in place.
Figure 8:
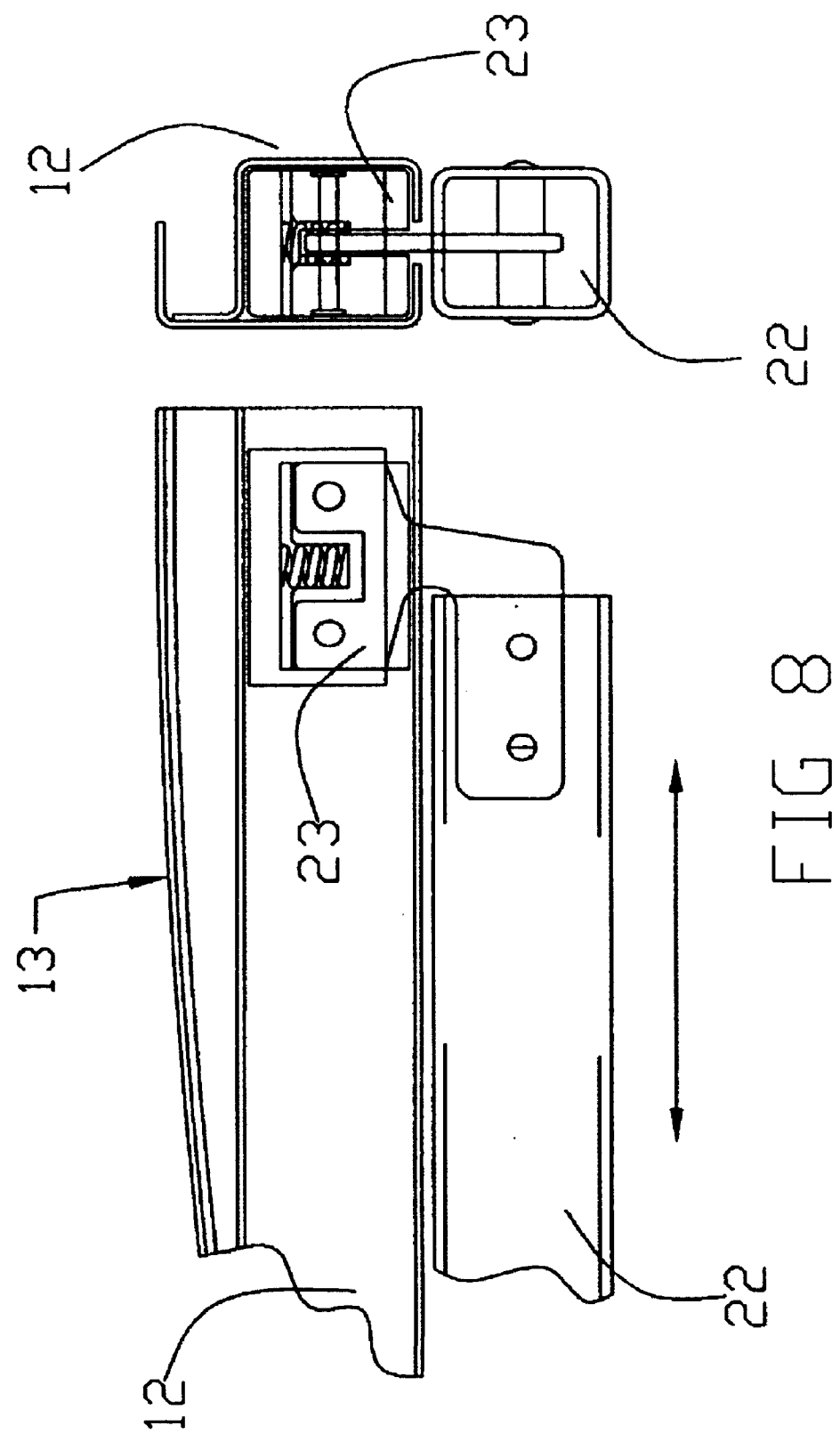
FIG. 8: is vehicle roof with lateral support ribs, sliding element, and roof rib of slide out module.
Figure 9:
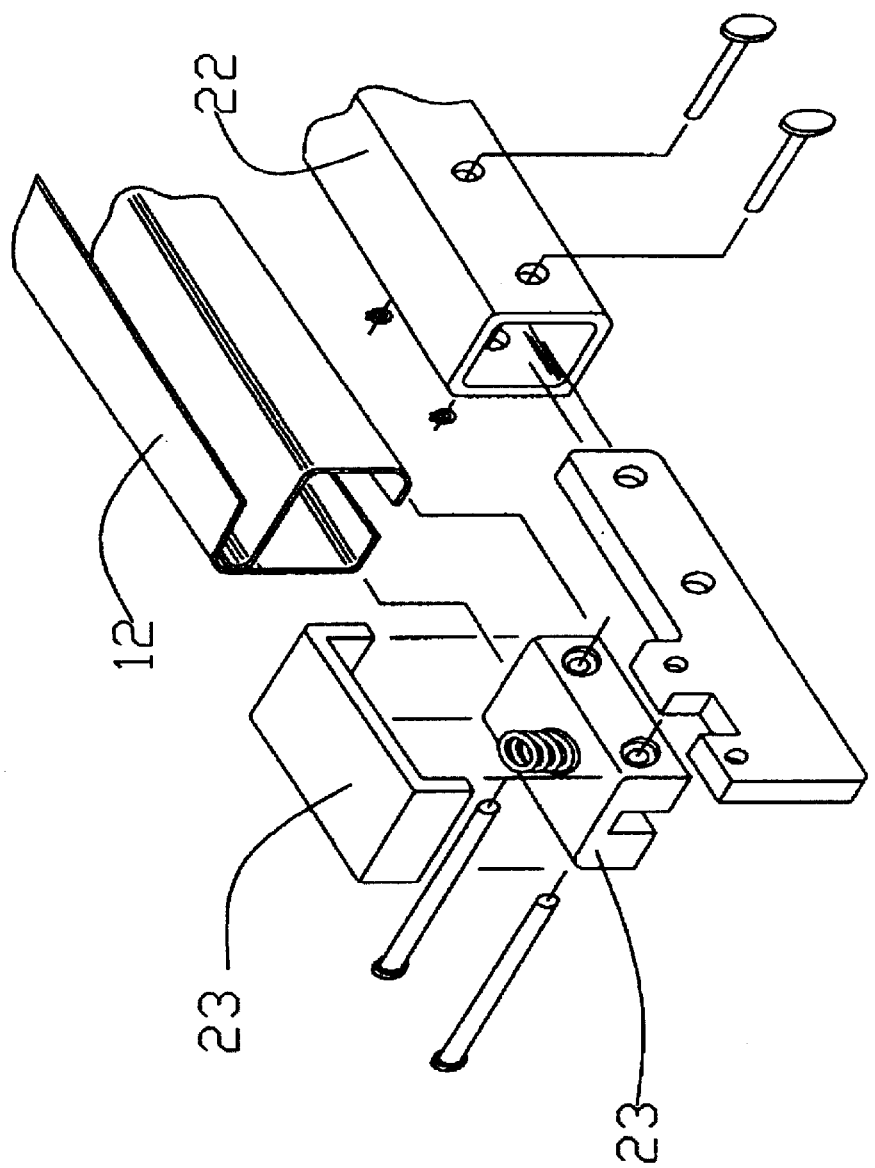
FIG. 9: is an isometric view of FIG. 8 components.
Figure 10:
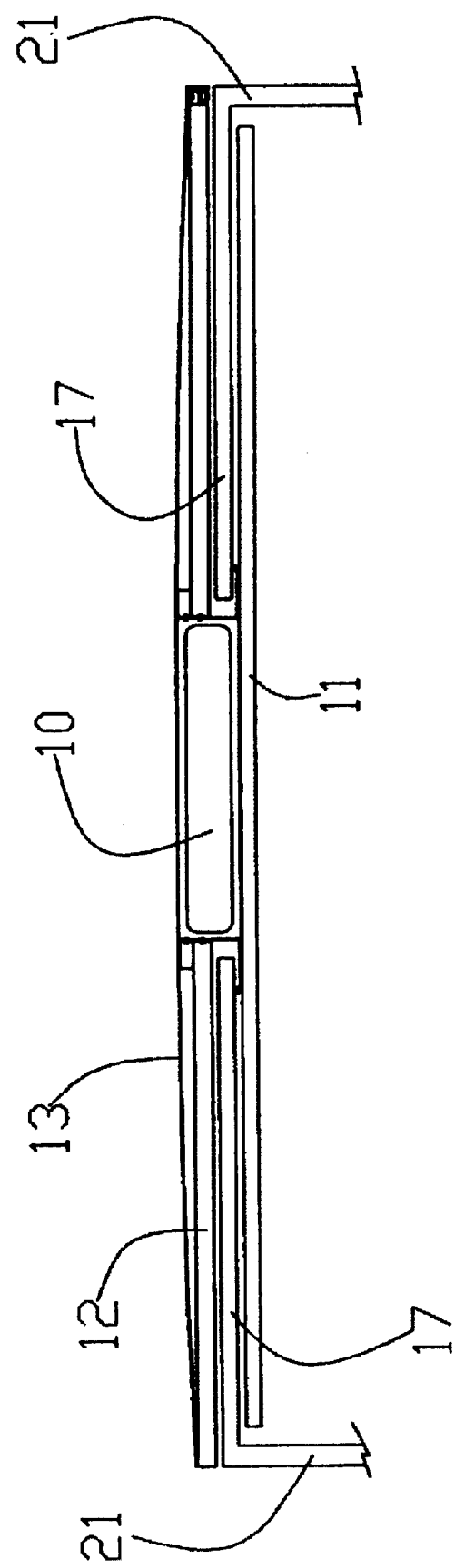
FIG. 10 is an end view of a central spar assembly plus a roof structure of slide-out module.

Each slide out module 1 (FIG. 6) is a monocoque type construction, which may be of fiberglass, aluminum, steel, stainless steel, carbon fiber, or other material consisting of a roof 17, floor 18, front wall 19, rear wall 20, and longitudinal wall 21. Each slide-out module 1 is assembled as a unit and then mounted on the lateral support rails 8 of the integrated chassis. Multiple roof ribs 22 are mechanically attached to the roof 17 of the slide-out module(s) 1. Each stationary lateral roof rib 12 in the vehicle roof is positioned above a roof rib 22 in the slide-out module and sliding elements 23 are mechanically attached to the medial end of each roof rib 22 of the slide-out module 1 (FIG. 7). Each sliding element 23 engages a vehicle roof rib 12 and remains engaged throughout the inward and outward movement of the slide-out module 1 (FIGS. 8 & 9). Since the roof 17 of each slide-out module telescopes between the stationary interior ceiling 11 and the stationary roof assembly of the vehicle (FIG. 10), the interior height of the slide-out module 1 is equal to the interior height of the vehicle. This is substantially different from the current technology of telescoping a slide-out room through the side wall of a vehicle.

Figure 11:
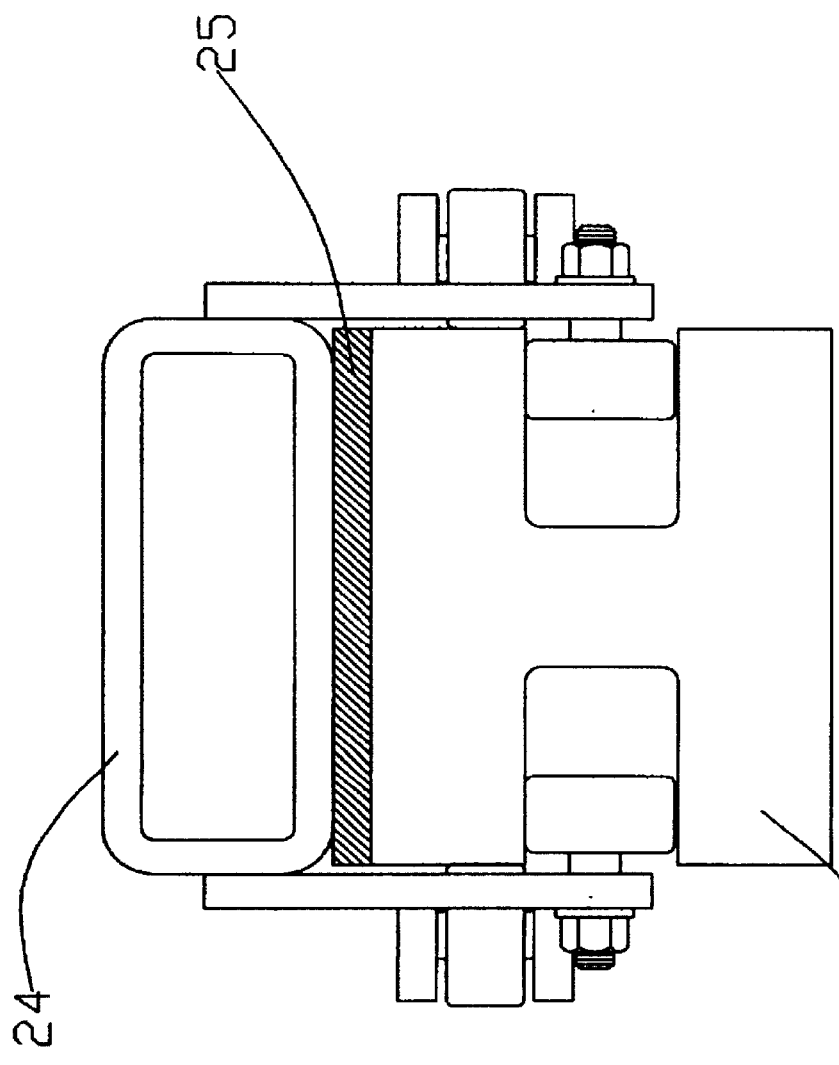
FIG. 11: is an end view of guide rail assemblies.

A guide rail assembly consists of a support rail 8 that is attached to the vehicle chassis and a guide rail 24 that is attached to the underside of each slide-out module 1 (FIG. 11). Pluralities of guide rail assemblies are mechanically attached to the vehicle chassis and extend laterally to the opposite side of the vehicle. The guide rails 24 support the slide-out modules 1 while retracted and extended, and by capturing the support rails 8 that are mounted to the vehicle chassis, support and guide the slide-out modules 1 during the movement between the retracted and extended positions. Also shown in FIG. 11 is a low-friction polymer plate 25 located between the support rails 8 and the guide rails 24 to provide a dry, lubrication free, bearing surface between these two structural members.

Figure 12:
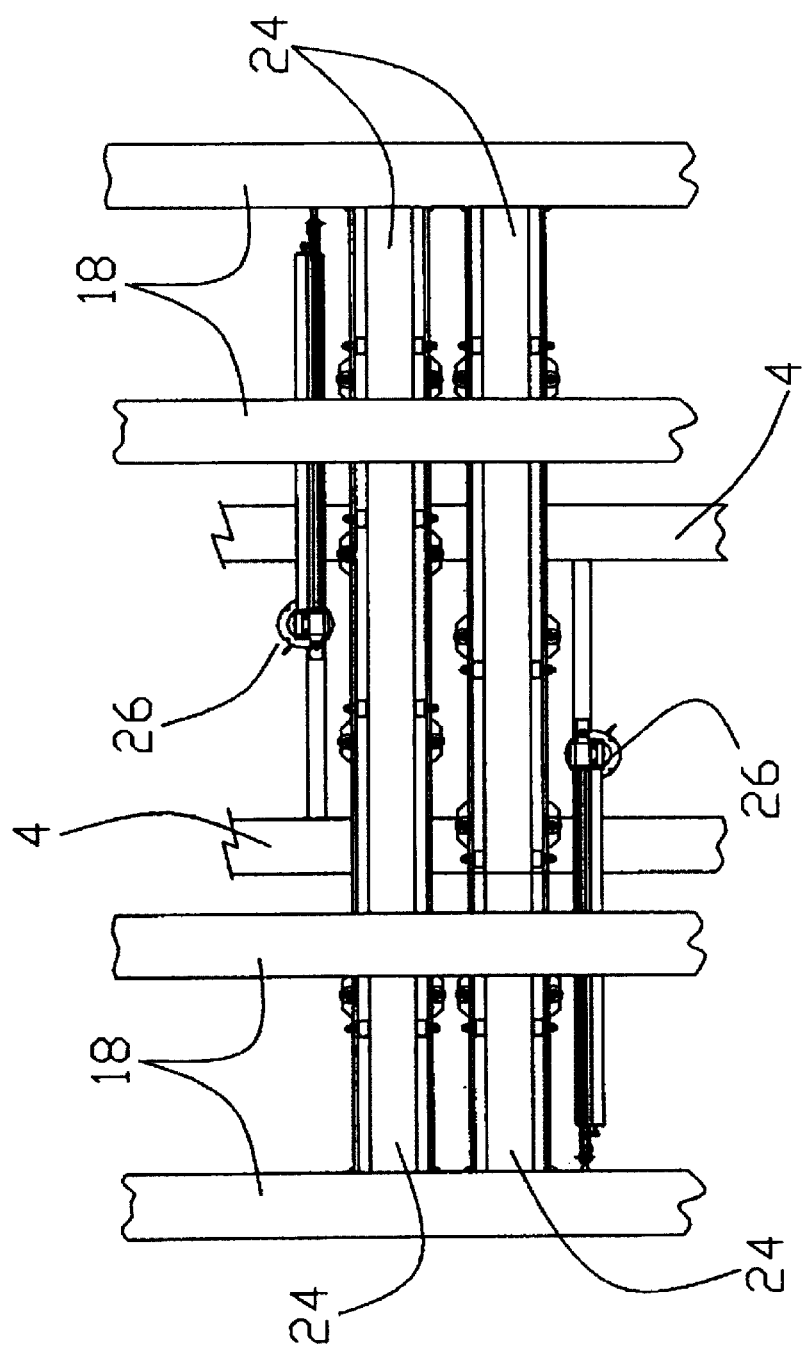
FIG. 12: is plan view, drive assemblies mounted under floor of slide and vehicle.
Figure 13:
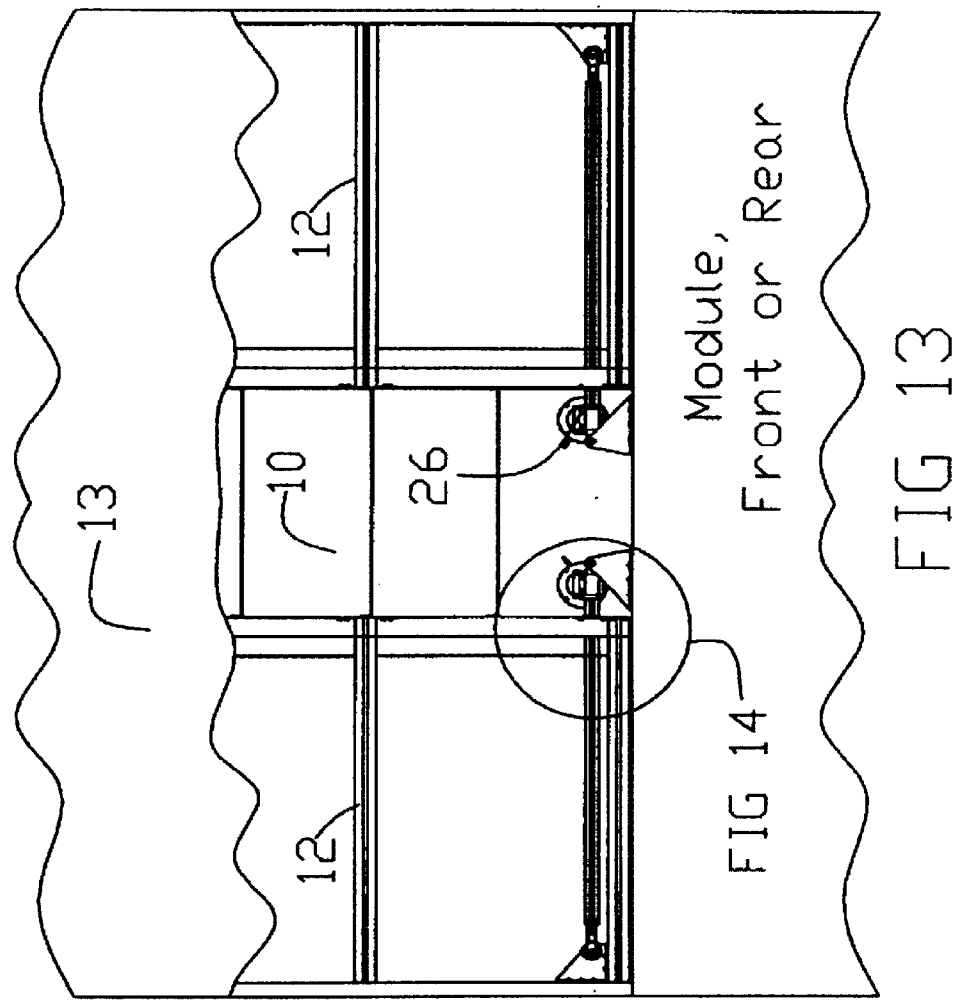
FIG. 13: shows linear actuators located within the roof structure of the stationary module.
Figure 14:
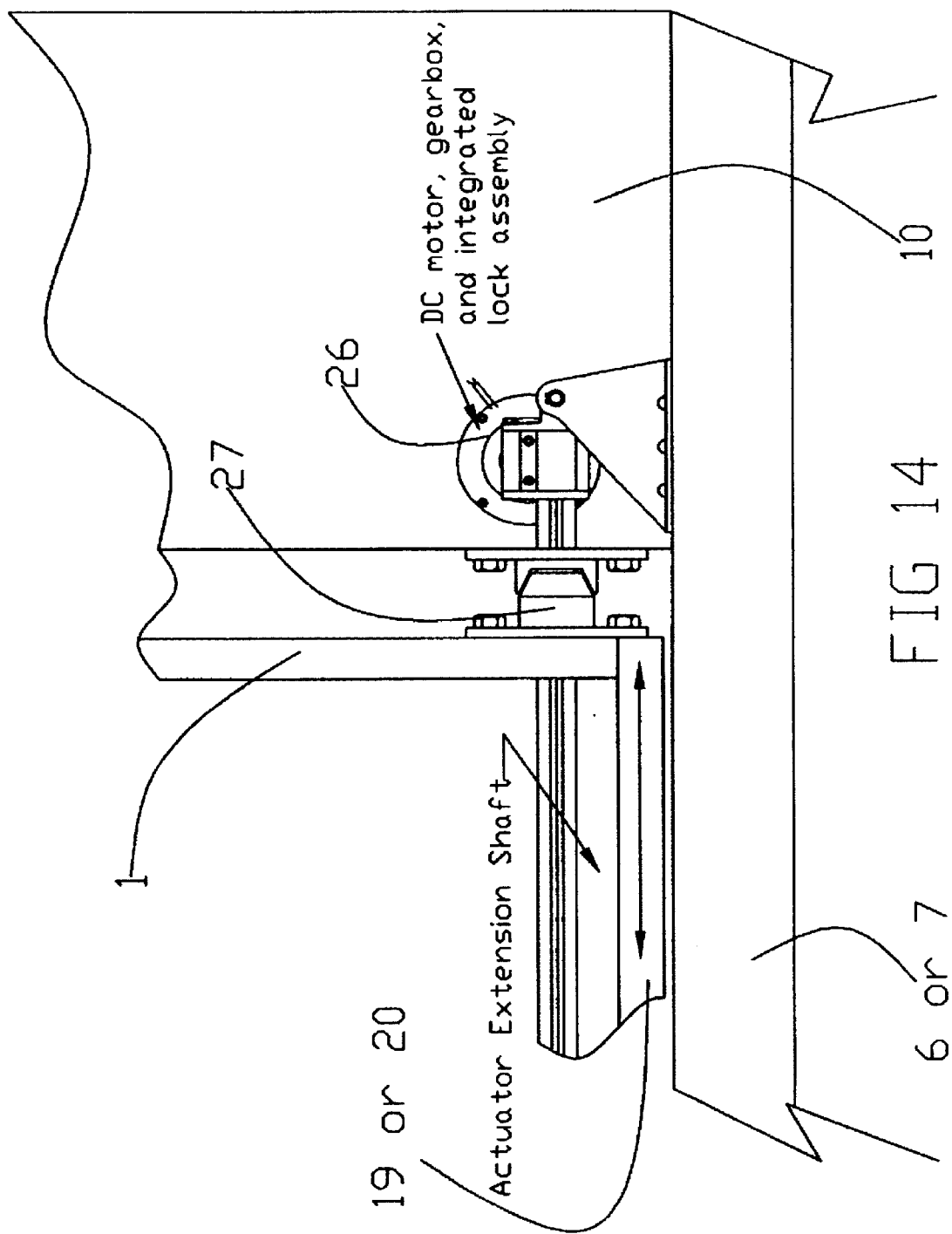
FIG. 14: is a linear actuator with integral DC motor, gear box, lock, and alignment pin assembly.

In the preferred embodiment, each slide-out module 1 is driven by four linear actuators 26 that are electronically synchronized for smooth extension and retraction. Each actuator consists of a DC drive motor, gearbox, lock assembly, and an extension shaft to apply pressure to the slide-out module 1. Two of these actuators 26 are located under the floor of the vehicle (FIG. 12) and two actuators 26 are located within the stationary roof structure of the vehicle (FIG. 13) for each slide-out module. Each slide-out module is locked front and rear as well as top and bottom by the linear actuators (FIG. 14) when the slide-out module is in the retracted or any deployed position. The actuator/lock assemblies 26 at the top mechanically fasten each slide-out module to the central spar 10. As shown in FIG. 12, the actuator/lock assemblies 26 under the floor mechanically lock the slide-out module to the vehicle chassis in either an extended or retracted position. In the retracted position, the slide-out modules 1 are held in alignment with the central spar 10 via tapered alignment pins 27.

Figure 3:
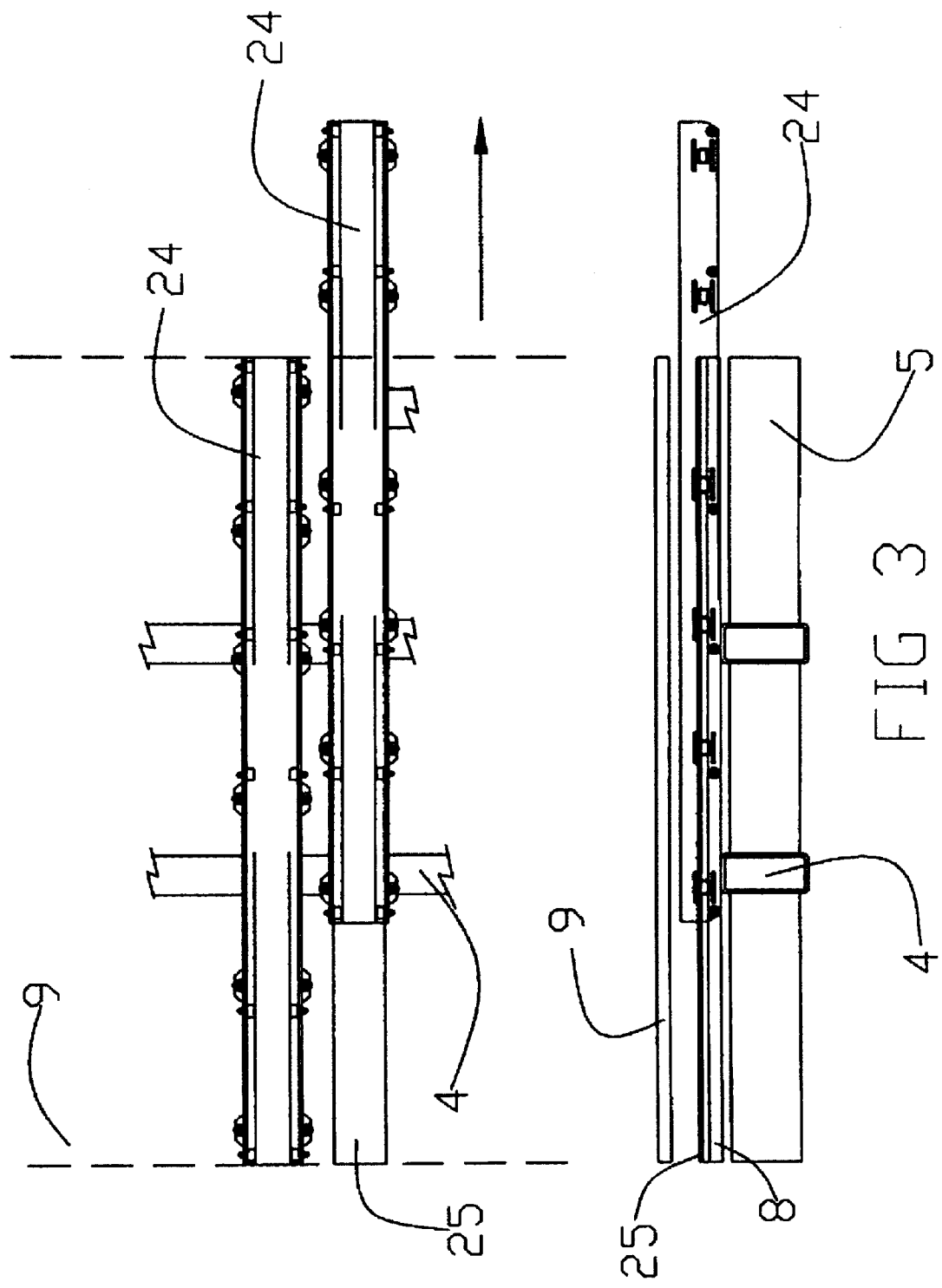
FIG. 3: shows plan and elevation views of lateral support rails with the driver's side rail extended.
Figure 4:
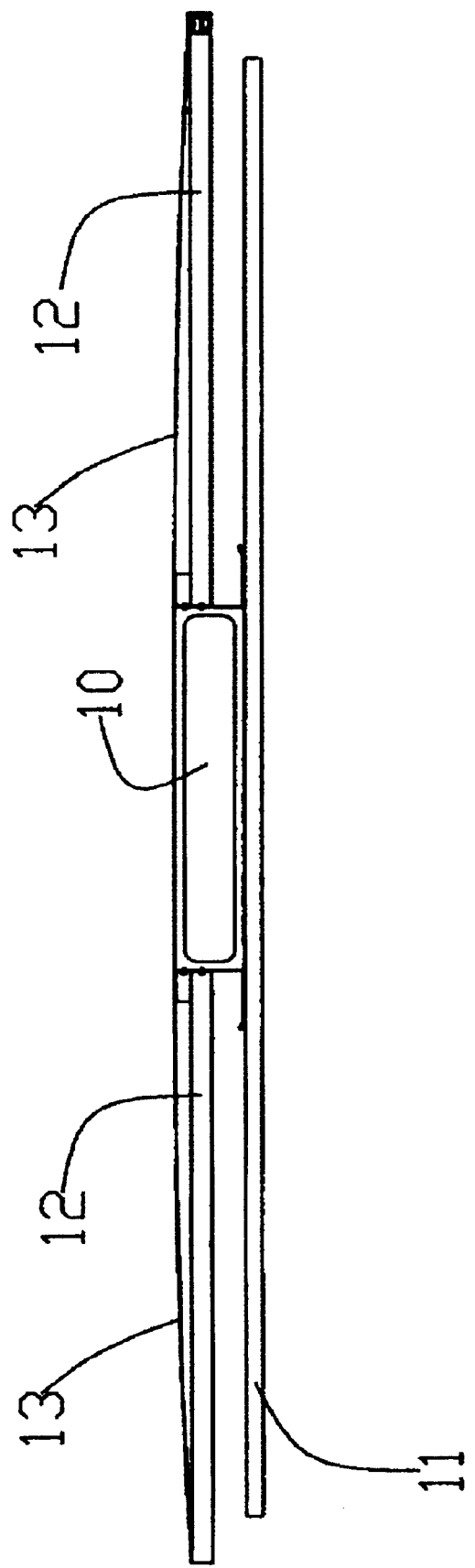
FIG. 4: is an end view of central spar assembly.
Figure 15:
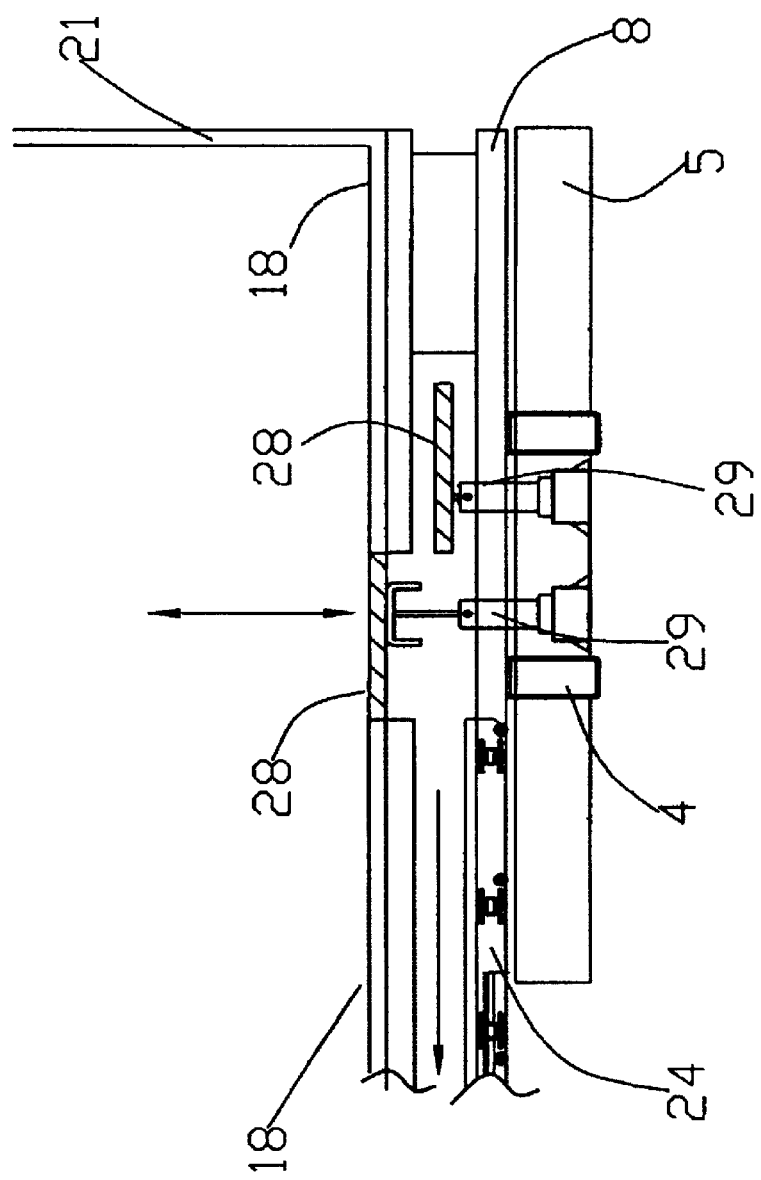
FIG. 15: is an end view of the vehicle that shows the relative positions of the vehicle chassis, the support rails for the slide out module, the floor of the two slide out modules and the sub floors that may be raised when each slide out module is extended. The sub floor may be two-piece, one sub-floor for each module, or one sub-floor that may be raised after both slide-out modules are extended.

As shown in FIG. 3, the floor 9 of the stationary structure can comprise the full width of the vehicle which can be 8 or 8½ feet, including wall thickness, in the travel position The floor 18 of the slide-out module 1 moves under the stationary floor 9. Another design is to have each full body slide-out module provide 50% of the floor width in the travel position and a sub-floor assembly 28 occupies a central position below the full body slide floor 18 (FIG. 15). Also shown in FIG. 15, the sub-floor assembly could be divided into smaller sections, which would allow a level floor during extension of one of both full body slides. In a retracted position, the floor 18 of the expandable portion of the full body slide would be above the sub-floor assembly 28. As the fully body slide is deployed, the floor 18 of the slide-out module would move outwardly and the sub floor assembly 28 would elevates to become flush with the floor 18 of the slide-out module. This is accomplished with pneumatic or hydraulic lift cylinders, or electro-mechanical lifts 29.

While the present invention has been described for a motorhome application, the principles may be applied to any vehicle, independently powered or towable. Variations and modifications to this description could be made without departing from the scope and spirit of the invention.

We claim:

1. A recreational vehicle comprises: a chassis, front and rear stationary modules, longitudinal trusses below a floor level, a plurality of lateral trusses, a plurality of lateral support rails mechanically attached to the longitudinal trusses, a central spar located in a roof, a plurality of lateral roof ribs extending from the central spar, an interior ceiling secured to the central spar, an exterior roof covering attached to the upper side of the lateral roof ribs, at least one full body slide-out module whose maximum length is restricted only by the distance between the stationary modules, and at least two roll bars.

2. The recreational vehicle of claim 1 wherein the at least one full body slide-out module is a monocoque construction comprising: a roof, a floor, a front wall, a rear wall, a longitudinal wall, a plurality of slide-out module roof ribs with a sliding element mechanically attached to the medial end of each said slide-out module roof rib thereby engaging each said lateral roof rib throughout inward and outward movement of the slide-out module, and a plurality of guide rails attached to the underside of the slide-out module; wherein in a retracted position the slide-out module is held in alignment to the central spar by tapered pins; wherein the roof of the slide-out module is sandwiched by and telescoped between the roof and interior ceiling of the chassis and provides an interior height in the slide-out module which is restricted only by the interior height of the chassis roof; wherein low-friction polymer plates providing a dry lubrication-free bearing surface are located between the guide rails and the lateral support rails; and wherein the plurality of guide rails capture the lateral support rails and support and guide the slide-out module during movement between the retracted position and an extended position.

3. The recreational vehicle of claim 2 wherein the floor of the at least one slide-out module moves under a stationary floor of the chassis whereby the stationary floor comprises the full width of the vehicle; and wherein the stationary floor provides a level surface when the slide-out module is in either the retracted position or the extended position.

4. The recreational vehicle of claim 2 wherein the chassis further includes a sub-floor assembly with a movable floor whereby each floor of two bilateral ones of said fully body slide-out modules comprises one half of the width of the vehicle; and wherein the sub-floor assembly occupies a central position below the slide-out module floor when the slide-out module is in the retracted position and elevates to become flush with the slide-out module floor when the slide-out module is in the extended position.

5. The recreational vehicle of claim 1 further comprises four electronically synchronized linear actuators by which the at least one full body slide-out module is driven; wherein the actuators consist of a direct current motor, a gearbox, a lock assembly, and an extension shaft, to provide smooth extension and retraction of the module; and wherein the actuators mechanically fasten the at least one slide-out module to the central spar and mechanically lock the module in retracted and extended positions.

* * * * *